United States Patent
Ha et al.

(10) Patent No.: US 8,134,454 B2
(45) Date of Patent: Mar. 13, 2012

(54) RECEIVER MODULE WITH DUAL MODE CAPABILITY

(75) Inventors: Wai-leung Ha, Pokfulam (HK); Kairy Kai Lei, Shen Zhen (CN); Gordon Qian, Shen Zhen (CN)

(73) Assignee: Computime, Ltd (HK)

( * ) Notice: Subject to any disclaimer, the term of this patent is extended or adjusted under 35 U.S.C. 154(b) by 896 days.

(21) Appl. No.: 12/055,497

(22) Filed: Mar. 26, 2008

(65) Prior Publication Data

US 2009/0247097 A1    Oct. 1, 2009

(51) Int. Cl.
*G05B 11/01* (2006.01)
*H04B 10/00* (2006.01)

(52) U.S. Cl. ............... 340/12.3; 340/12.22; 398/106; 398/115

(58) Field of Classification Search ............. 340/825.69, 340/12.3, 12.22; 398/115, 106–112
See application file for complete search history.

(56) References Cited

U.S. PATENT DOCUMENTS

| | | | | |
|---|---|---|---|---|
| 5,109,222 | A * | 4/1992 | Welty | 340/12.28 |
| 5,227,780 | A * | 7/1993 | Tigwell | 340/13.22 |
| 6,118,442 | A * | 9/2000 | Tanigawa | 715/719 |
| 6,529,556 | B1 * | 3/2003 | Perdue et al. | 375/260 |
| 6,803,854 | B1 | 10/2004 | Adams et al. | |
| 6,812,881 | B1 * | 11/2004 | Mullaly et al. | 341/176 |
| 2005/0119770 | A1 * | 6/2005 | Park et al. | 700/65 |
| 2005/0137018 | A1 * | 6/2005 | Dernis et al. | 463/43 |
| 2006/0104291 | A1 * | 5/2006 | Rodriguez et al. | 370/401 |
| 2006/0231631 | A1 * | 10/2006 | Kawamata | 235/472.01 |
| 2007/0150078 | A1 * | 6/2007 | Tanabe et al. | 700/33 |

FOREIGN PATENT DOCUMENTS

| | | |
|---|---|---|
| CN | 1488126 A | 4/2004 |
| CN | 1820422 A | 8/2006 |

OTHER PUBLICATIONS

International Search Report for PCT/CN2009/071002, dated Jul. 2, 2009, pp. 1-5.

* cited by examiner

*Primary Examiner* — Daniel Wu
*Assistant Examiner* — Kam Ma
(74) *Attorney, Agent, or Firm* — Banner & Witcoff, Ltd.

(57) ABSTRACT

The present invention supports the remote control of a controlled device. A hybrid device receives a control signal over an infrared communications channel or a wireless networking channel. The hybrid device can replace an IR receiver module in the controlled device in order to provide backward compatibility as well as provide universal operation with a wireless networking controller. The hybrid device processes a signal received over one of the communications channels. When a signal is received over the infrared communications channel, the processor converts the signal to an output code that is sent to a device controller. When a signal is received over the wireless networking communications channel, the processor converts the signal to a wireless command, converts the wireless command to an output code, and sends the output code to the device controller. All output codes are transparent for the two communications channels.

13 Claims, 5 Drawing Sheets

RECEIVER MODULE WITH DUAL MODE CAPABILITY

BACKGROUND OF THE INVENTION

Television and audio/video devices are typically controlled remotely from a remote controller that operates in the infrared (IR) frequency range when a user enters a command. An infrared signal is typically modulated with a modulating signal at approximately 38 KHz. At the receiver side (i.e., at the controlled device), a receiver may be implemented as a metal sealed module with a built-in amplifier and a band pass filter for demodulation. The module typically provides a serial output with demodulated data to the controller of a controlled device (e.g., television or audio/visual device). The controller consequently controls the device in accordance with the command.

However, television and audio/video devices that are manufactured by different manufacturers are typically incompatible with different remote controllers. Even with remote controllers that can be programmed for devices of different manufacturers, a user is typically required to configure the remote controller for a specific device. Thus, there is a market need to provide a universal remote controller that facilitates operation over a spectrum of different manufacturers.

SUMMARY OF THE INVENTION

The present invention provides apparatuses, computer readable media, and methods for remotely controlling a controlled device. A hybrid device receives a control signal over an infrared communications channel or a wireless networking channel. The hybrid device can replace an IR receiver module in the controlled device in order to provide backward compatibility as well as provide universal operation with a wireless networking controller.

With another aspect of the invention, a hybrid device includes a first communications interface configured to support a first communications channel, a second communications interface configured to support a second communications channel, and processor to process a signal received over one of the communications channels. When a signal is received over the first communications channel, the processor converts the signal to an output code and sends the output code to a device controller to control a device. When a signal is received over the second communications channel, the processor converts the signal to a wireless command, converts the wireless command to an output code, and sends the output code to the device controller to control the device. All output codes are transparent for the first communications channel and the second communications channel.

With another aspect of the invention, the first communications interface supports an infrared channel and the second communications interface supports a wireless networking communications channel.

With another aspect of the invention, the second communications interface supports two-way communication between the hybrid device and a remote controller. The hybrid device provides a supported command list over the second communications channel to the remote controller.

With another aspect of the invention, the hybrid device and an infrared receiver module have the same hardware pin configuration so that a manufacturer can replace the IR receiver module with the hybrid device to provide compatibility with a wireless networking controller.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION

With an embodiment of the invention, a hybrid device receives a control signal over an infrared communications channel or a wireless networking channel. The hybrid device can replace an IR receiver module in the controlled device in order to provide backward compatibility as well as provide universal operation with a wireless networking controller.

Figure 1:
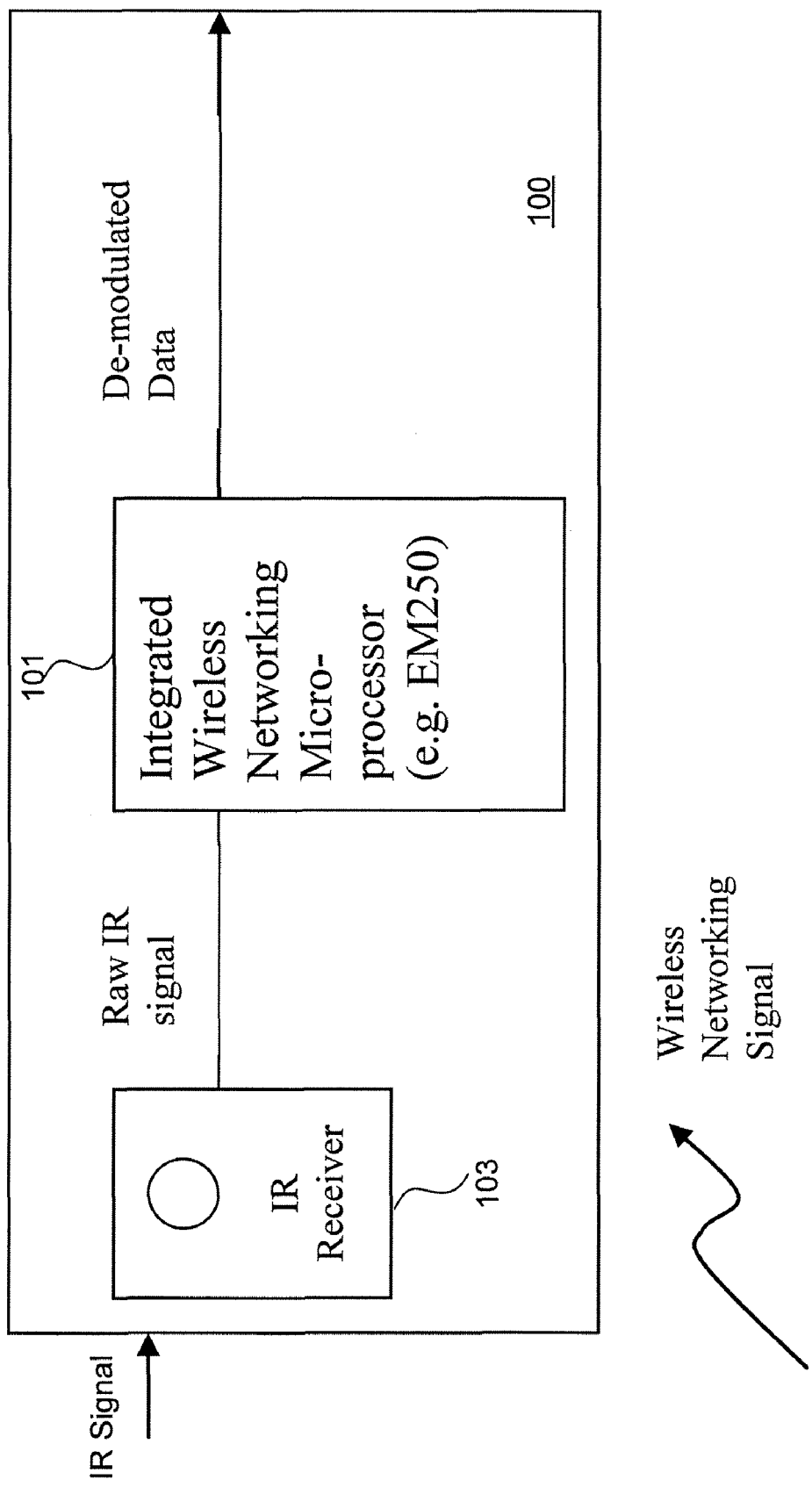
FIG. 1 shows a hybrid device for controlling a controlled device in accordance with an embodiment.

FIG. 1 shows a hybrid device 100 for controlling controlled device (not shown) in accordance with an embodiment. Hybrid module 100 comprises wireless networking processor 101 and infrared (IR) receiver 103. With an embodiment, processor 101 comprises an EM250 ZigBee SoC manufactured by Ember, which is headquartered in Boston, Mass. The EM250 chip is a true ZigBee System-on-Chip that combines a 2.4 GHz IEEE 802.15.4 compliant radio transceiver with a powerful, efficient 16-bit XAP-2 microprocessor with comprehensive hardware supported network-level debugging features to simplify development.

Wireless networking processor 101 may include a wireless transmitter and receiver to support a two-way communications channel that supports a wireless technology. Wireless networking processor may include a built-in antenna to receive a wireless signal at the desired frequency.

According to an embodiment, low cost, hybrid device 100 includes low power two-way RF or wireless networking technology, e.g., ZigBee and Z-Wave, to provide networking capabilities to appliances, e.g., televisions and audio/visual (A/V) systems. (While wireless networks typically operate in the 800-900 MHz and the 2.4 GHz range, embodiments support other frequency spectra in the radio frequency, visible light and infrared spectra.) Embodiments facilitate TV and A/V manufacturers to move into wireless technology and to build the capability of wireless networking in their product. Furthermore, embodiments also provide compatibility with IR remote technology to provide backward compatibility.

Hybrid device 100 addresses the above considerations. With an embodiment, hybrid device 100 utilizes wireless networking technology to provide a supported command list back to a wireless networking remote controller over a two-way communications channel. With this approach, together with icon based color liquid crystal display (LCD) or organic light emitting diode (OLED) display remote unit, embodiments of the invention can support a truly universal remote controller.

With an embodiment, hybrid device 100 may send information other than the supported command list to the wireless networking remote controller. For example, hybrid device 100 may send the specification of the device, e.g., the resolution of the television and the current status of the controlled device, e.g., channel and sound level, to the remote controller for display.

Figure 2:
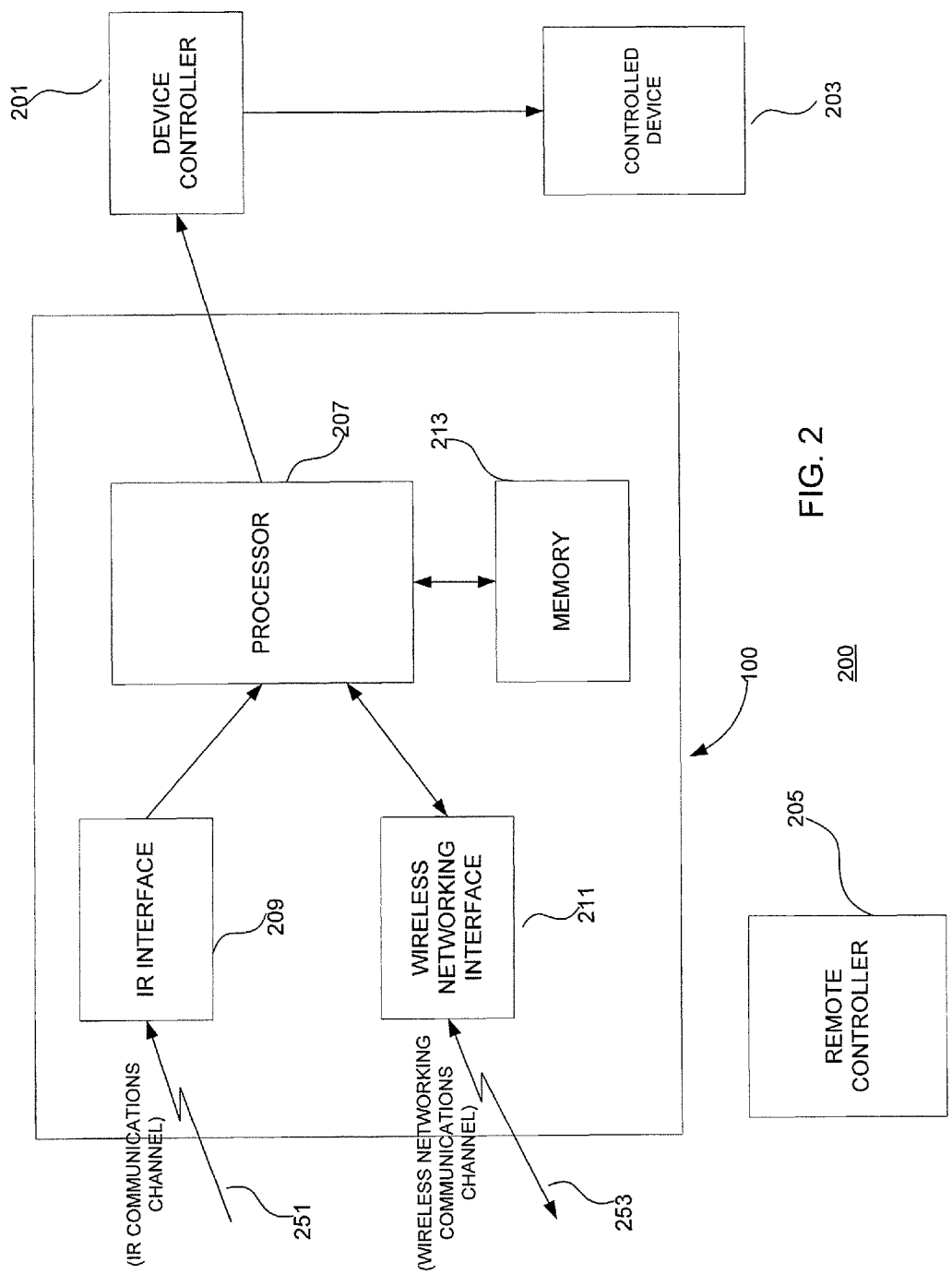
FIG. 2 shows a system in which a controlled device is controlled over an infrared communications channel or a wireless networking communications channel in accordance with an embodiment.

FIG. 2 shows system 200 in which controlled device 203 is controlled through hybrid device 100 over an infrared communications channel 251 or a wireless networking channel 253 by remote controller 205 in accordance with an embodiment. A control signal may be received from an IR remote controller (not shown) through IR interface 209 or from wireless networking remote controller 205 through wireless networking interface 211.

An IR remote controller (not shown) sends an IR modulated signal over IR communications channel 251 in order to convey a command that is entered by a user. After demodulation by IR interface 209, processor 207 processes the demodulated data and converts it to an output code. The output code is then sent to device controller in order to control device 203 (e.g., a television). As will be further discussed, the mapping of output codes to demodulated data is the same as with a traditional IR receiver module in order to provide backwards compatibility.

Moreover, for wireless network commands received from remote controller 205 over wireless networking communications channel 253, a set of fixed commands may be used for different controlled devices (e.g., televisions and A/V equipment). Commands may be a single byte (8 bit, 0-255), two bytes (16 bit, 0-65535) or any number of bytes as required defined. For example, as shown in Table 1, wireless command codes may map to commands as follow:

TABLE 1

WIRELESS COMMAND MAPPING

| Command keys stored in receiver | Wireless command Code | Stored command description |
| --- | --- | --- |
| 0 | 0x10 | 0 |
| 1 | 0x11 | 1 |
| 2 | 0x12 | 2 |
| 3 | 0x13 | 3 |
| 4 | 0x14 | 4 |
| 5 | 0x15 | 5 |
| 6 | 0x16 | 6 |
| 7 | 0x17 | 7 |
| 8 | 0x18 | 8 |
| 9 | 0x19 | 9 |
| Volume Up | 0x20 | Vol Up |
| Volume Down | 0x21 | Vol Dn |
| Channel Up | 0x22 | Ch Up |
| Channel Down | 0x23 | Ch Dn |
| Mute | 0x24 | Mute |
| Play | 0x25 | Play |
| Fast Forward | 0x26 | FF |
| Fast Backward | 0x27 | FB |

Wireless networking remote controller 205 may be paired (matched) with the hybrid device 100 in order to control controlled device 203. Once it is paired, hybrid device 100 may send the commands as defined with the command code and command description to the remote controller 205. Wireless remote controller 205 can form the remote pattern based on the information sent by hybrid device 100. The command description can be shown on top of the virtual key displayed by a LCD display in conjunction with a touch-sensing input. If there is no command description, the default command description can be used. However, with the command description, any special newly defined key not in the pre-defined list can be forwarded to remote controller 205.

Once the connection between remote controller 205 and hybrid device 100 is established, a user can control device 203 through remote controller 205 with the same full keyboard functionality that device 203 supports with infrared operation. For example, if the user presses Key 0 on the wireless networking remote controller 205, a command 0 is sent to hybrid device 100. Processor 207 obtains the demodulated data for "Key 0" from wireless networking interface 211 and matches the demodulated data to the output code for "Key 0." Processor 207 then sends the output code to device controller 201. Processor 207 may match the demodulated data with the output code using a look-up table in memory 213 that contains the content of Table 1. Applying the same approach to all of the other keys, any key pressed by the wireless networking remote controller 205 to hybrid device 100 results in the same output code being sent to device controller 201 as when signal is sent over IR communications channel 251 from an IR remote controller. With the installation of hybrid device 100, there is no need to change any of the hardware or firmware design of device controller 201. Consequently, this approach may reduce the development cycle of television engineering to transform the existing television design into a wireless networking controlled television.

Wireless networking controller 205 only needs a standard set of commands for different devices (e.g., televisions and A/V equipment) that may be manufactured by different manufacturers. As will be discussed, transparency can be provided by properly configuring a receiver output table (e.g., Table 4). With embodiments of the invention, commands may be from a standard list of a wireless networking definition organization.

The following two examples exemplify aspects of the invention. For example, for brand A TV set, the IR demodulated code is specified as follows.

TABLE 2

IR COMMAND TABLE

| Key | IR demodulated code of Brand A (in hex format) |
| --- | --- |
| 0 | 0x23 |
| 1 | 0x31 |
| 2 | 0x16 |
| 3 | 0x18 |
| 4 | 0x19 |
| 5 | 0x1A |
| 6 | 0x13 |
| 7 | 0x22 |
| 8 | 0x33 |
| 9 | 0x54 |
| Volume Up | 0x05 |
| Volume Down | 0x65 |
| Channel Up | 0x73 |
| Channel Down | 0x32 |
| Mute | 0x43 |
| Play | 0x25 |
| Fast Forward | 0x02 |
| Fast Backward | 0x07 |

The association of wireless commands with command keys are as follow:

TABLE 3

WIRELESS COMMAND TABLE

| Key | Wireless command |
|---|---|
| 0 | 0x10 |
| 1 | 0x11 |
| 2 | 0x12 |
| 3 | 0x13 |
| 4 | 0x14 |
| 5 | 0x15 |
| 6 | 0x16 |
| 7 | 0x17 |
| 8 | 0x18 |
| 9 | 0x19 |
| Volume Up | 0x20 |
| Volume Down | 0x21 |
| Channel Up | 0x22 |
| Channel Down | 0x23 |
| Mute | 0x24 |
| Play | 0x25 |
| Fast Forward | 0x26 |
| Fast Backward | 0x27 |

Combining the content of Tables 2 and 3, one can configure the receiver output table as shown in Table 4.

TABLE 4

RECEIVER OUTPUT TABLE

| Key | Wireless command Table (for all TV) | Output code to TV controller for Brand A TV (in hex format) |
|---|---|---|
| 0 | 0x10 | 0x23 |
| 1 | 0x11 | 0x31 |
| 2 | 0x12 | 0x16 |
| 3 | 0x13 | 0x18 |
| 4 | 0x14 | 0x19 |
| 5 | 0x15 | 0x1A |
| 6 | 0x16 | 0x13 |
| 7 | 0x17 | 0x22 |
| 8 | 0x18 | 0x33 |
| 9 | 0x19 | 0x54 |
| Volume Up | 0x20 | 0x05 |
| Volume Down | 0x21 | 0x65 |
| Channel Up | 0x22 | 0x73 |
| Channel Down | 0x23 | 0x32 |
| Mute | 0x24 | 0x43 |
| Play | 0x25 | 0x25 |
| Fast Forward | 0x26 | 0x02 |
| Fast Backward | 0x27 | 0x07 |

The receiver output table may be implemented in hybrid device 100 as a look-up table in memory 213. For example, if processor 207 obtains wireless command 0x20 from a signal received over wireless networking communications 253, processor 207 determines that the corresponding output code is 0x05 and sends command code 0x05 to device controller 201. Device controller 201 consequently instructs device 203 to increase the volume (Volume Up).

As another example, with brand B TV, the IR demodulated code is specified as follows:

TABLE 5

IR COMMAND TABLE

| Key | IR demodulated code of Brand B (in hex format) |
|---|---|
| 0 | 0x55 |
| 1 | 0x26 |

TABLE 5-continued

IR COMMAND TABLE

| Key | IR demodulated code of Brand B (in hex format) |
|---|---|
| 2 | 0x47 |
| 3 | 0x19 |
| 4 | 0x17 |
| 5 | 0x8B |
| 6 | 0xC2 |
| 7 | 0x81 |
| 8 | 0x90 |
| 9 | 0xA1 |
| Volume Up | 0x32 |
| Volume Down | 0x38 |
| Channel Up | 0x21 |
| Channel Down | 0x15 |
| Mute | 0x02 |
| Play | 0x06 |
| Fast Forward | 0x09 |
| Fast Backward | 0x11 |

Combining the content of Tables 3 and 5, one configures the receiver output table as shown in Table 6.

TABLE 6

RECEIVER OUTPUT TABLE

| Key | Wireless command Table (for all TV) | Output code to TV controller for Brand B TV (in hex format) |
|---|---|---|
| 0 | 0x10 | 0x55 |
| 1 | 0x11 | 0x26 |
| 2 | 0x12 | 0x47 |
| 3 | 0x13 | 0x19 |
| 4 | 0x14 | 0x17 |
| 5 | 0x15 | 0x8B |
| 6 | 0x16 | 0xC2 |
| 7 | 0x17 | 0x81 |
| 8 | 0x18 | 0x90 |
| 9 | 0x19 | 0xA1 |
| Volume Up | 0x20 | 0x32 |
| Volume Down | 0x21 | 0x38 |
| Channel Up | 0x22 | 0x21 |
| Channel Down | 0x23 | 0x15 |
| Mute | 0x24 | 0x02 |
| Play | 0x25 | 0x06 |
| Fast Forward | 0x26 | 0x09 |
| Fast Backward | 0x27 | 0x11 |

For both brand A and brand B televisions, the wireless networked commands are the same but the output codes are different as reflected in different configurations of the receiver output table as implemented in hybrid device 100. (One should note that different brand televisions have differently configured receiver output tables configured in corresponding hybrid devices.)

Memory 213 may include different forms of computer-readable media that can be accessed by processor 207. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism. With an embodiment, the receiver output table (e.g., Table 4 or 6) may be implemented as a look-up table in memory 213. Also, processor 207 may execute a sequence of computer-executable instructions in memory 207 in order to process signals received over communication channels 251 and 253.

Figure 3:
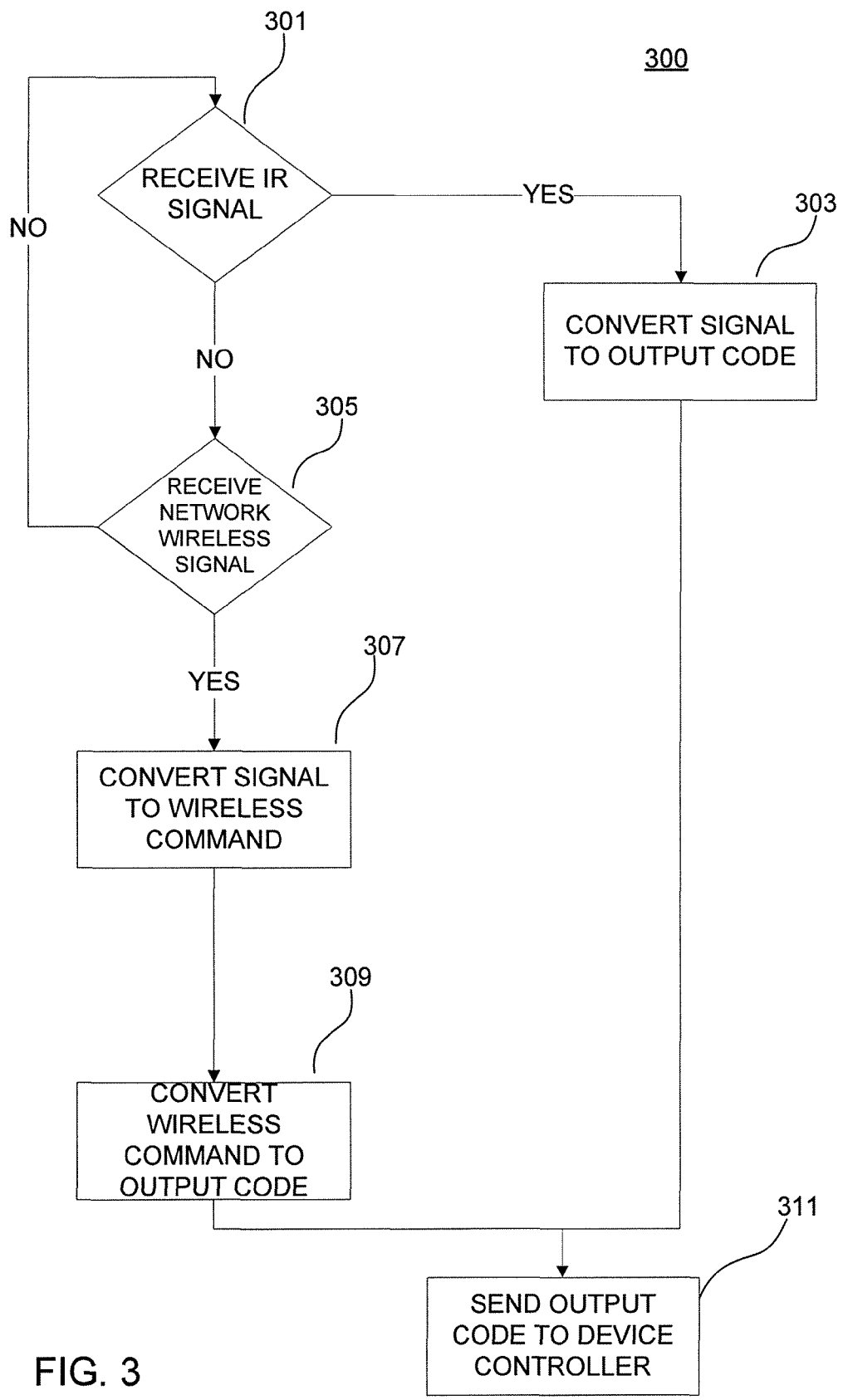
FIG. 3 shows a flow diagram for a hybrid device in accordance with an embodiment.

FIG. 3 shows flow diagram 300 for hybrid device 100 in accordance with an embodiment. If step 301 determines that a signal was received over IR communications channel 251, then the signal is processed to determine the output code in step 303. The output code is then sent to device controller 201 in step 311. If step 305 determines that a signal was received over wireless networking communications channel 253, then processor 207 processes the signal to obtain the corresponding wireless command in step 307. Processor 207 then converts the corresponding wireless command to the output code in step 309. Processor 207 may use a look-up table (e.g., corresponding to Table 4 or 6) to determine the conversion. The output code is then sent to the device controller in step 311.

Figure 4:
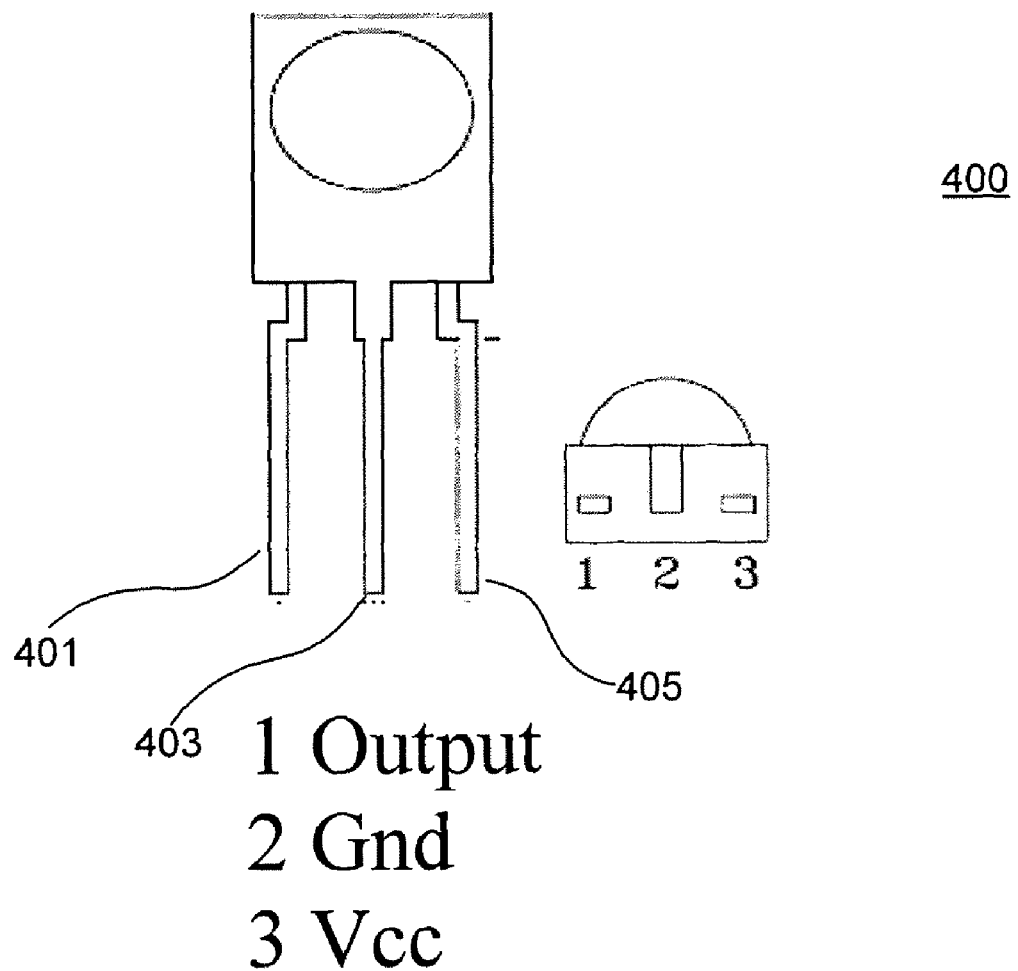
FIG. 4 shows a hardware pin configuration for a hybrid device in accordance with an embodiment.

FIG. 4 shows hardware pin configuration 400 for hybrid device 100 in accordance with an embodiment. Pin configuration 400 has the same pin configuration (output pin 401, ground 403, and Vcc 405) as an infrared receiver module. Consequently, a manufacturer can replace the IR receiver module with hybrid device 100 in order to support wireless networking remote controller 205 without redesigning device controller 201.

Figure 5:
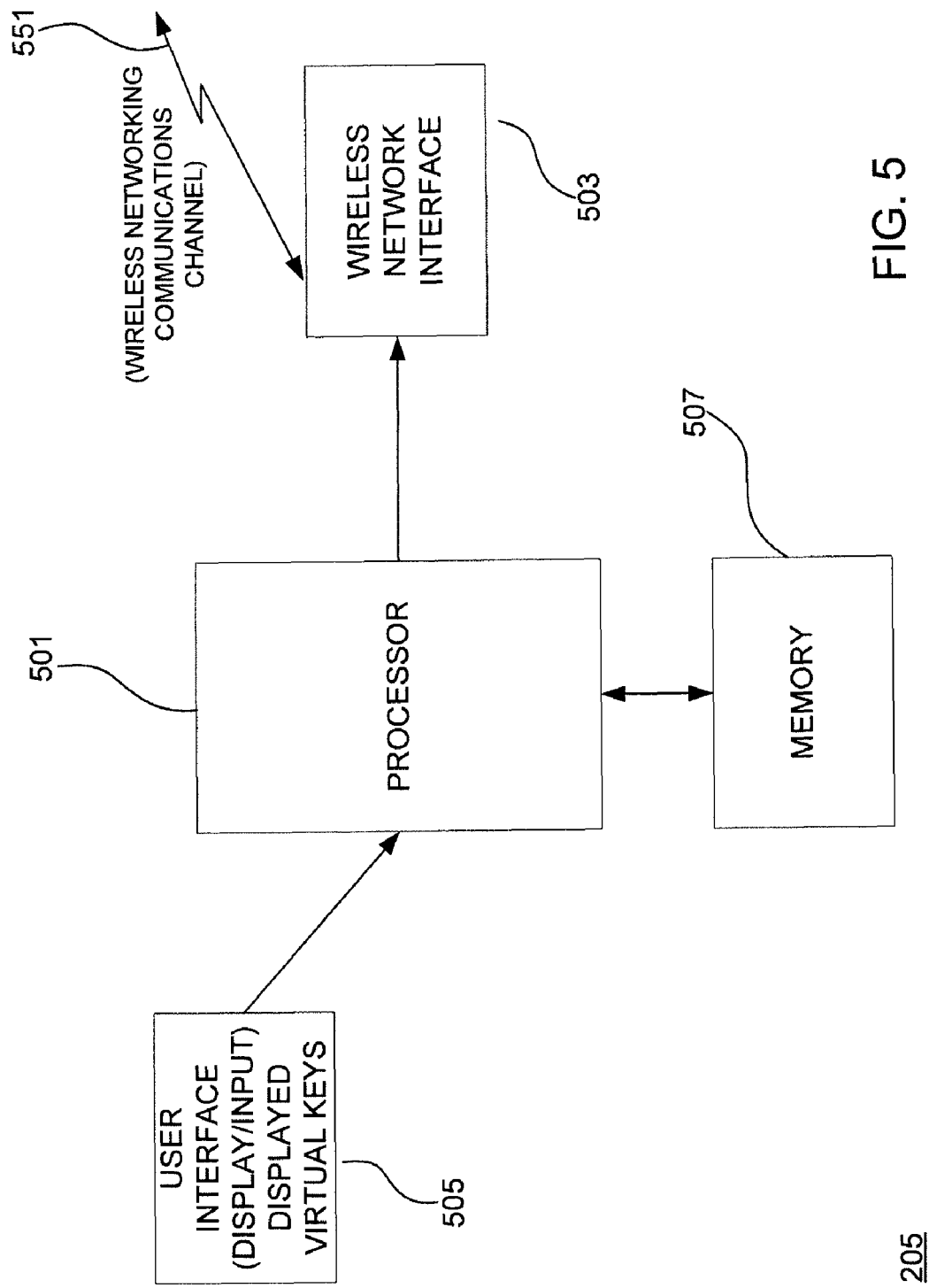
FIG. 5 shows a remote controller in accordance with an embodiment.

FIG. 5 shows remote controller 205 in accordance with an embodiment. Processor 501 communicates with hybrid device 100 over wireless networking communications channel 551 through wireless network interface 503.

Processor 501 interacts with a user through user interface 505, which may display virtual keys based on the command list provided by hybrid device 100 over wireless networking communications channel 551 and obtain a user input by sensing the user touching a selected virtual key.

Memory 507 may include different forms of computer-readable media that can be accessed by processor 501. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism. Processor 501 may execute a sequence of computer-executable instructions in memory 507 in order to configure the virtual keys and to send command signals to hybrid device 100.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a first communications interface configured to support a first communications channel;
a second communications interface configured to support a second communications channel; and
a processor coupled to the first communications interface and the second communications interface and configured to perform:
when a first signal is received over the first communications channel, converting the first signal to a first output code and sending the first output code to a device controller to control a device, wherein the first output code is from a first mapping; and
when a second signal is received over the second communications channel, converting the second signal to a wireless command, converting the wireless command to a second output code, and sending the second output code to the device controller to control the device, wherein the second output code is from a second mapping, wherein:
at least one device command code transported in the first signal has a different code value than with the second signal and when the first and second output codes are equal;
a pin configuration of the apparatus has a same pin configuration as an infrared (IR) receiver module for controlling the device; and
the apparatus replaces the infrared receiver module.

2. The apparatus of claim 1, wherein the first communications interface supports an infrared communications channel and the second communications interface supports a wireless networking communications channel.

3. The apparatus of claim 2, wherein the second communications interface supports a ZigBee protocol.

4. The apparatus of claim 2, wherein the second communications interface supports a Z-Wave protocol.

5. The apparatus if claim 1, wherein the second communications interface supports two-way communication between the apparatus and a remote controller.

6. The apparatus of claim 5, wherein the processor is further configured to perform:
providing a supported command list over the second communications channel to the remote controller.

7. The apparatus of claim 5, wherein the processor is further configured to perform:
providing a current status of the device over the second communications channel to the remote controller.

8. The apparatus of claim 5, where the processor is further configured to perform:
providing a specification of the device over the second communications channel to the remote controller.

9. A method comprising:
receiving, by an apparatus, a first signal over a first communications channel;
receiving, by the apparatus, a second signal over a second communications channel;
when a first signal is received over the first communications channel, converting, by the apparatus, the first signal to a first output code and sending the first output code to a device controller to control a device, wherein the first output code is from a first mapping; and
when a second signal is received over the second communications channel, converting, by the apparatus, the second signal to a wireless command, converting the wireless command to a second output code, and sending the second output code to the device controller to control the device, wherein:
the second output code is from a second mapping;
at least one device command code transported in the first signal has a different code value than with the second signal when the first and second output codes are equal;
a pin configuration of the apparatus has a same pin configuration as an infrared (IR) receiver module for controlling the device; and
the apparatus replaces the IR receiver module.

10. The method of claim 9, wherein the first communications interface supports an infrared channel and the second communications interface supports a wireless networking channel.

11. The method of claim 9, further comprising:
providing a supported command list over the second communications channel to a remote controller, wherein the second communications channel supports two-way communication between the apparatus and the remote controller.

12. The method of claim 9, further comprising:
providing a current status of the device over the second communications channel to the remote controller, wherein the second communications channel supports two-way communication between the apparatus and the remote controller.

13. The method of claim 9, further comprising:
providing a specification of the device over the second communications channel to the remote controller, wherein the second communications channel supports two-way communication between the apparatus and the remote controller.

* * * * *